March 1, 1927.
G. A. ANDERSON
1,619,688
TRUCK SIDE FRAME
Filed Dec. 27, 1922    2 Sheets-Sheet 1
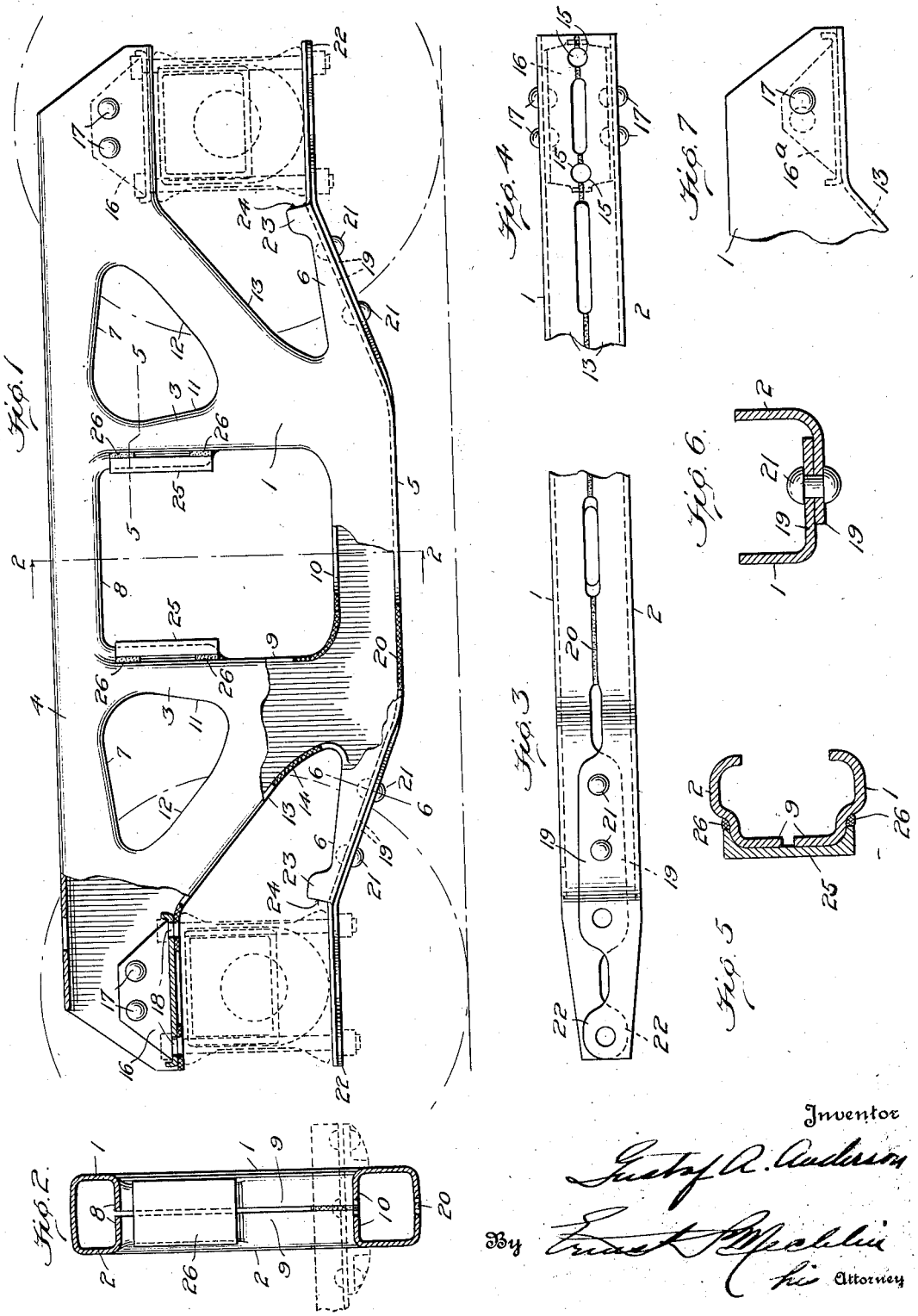

March 1, 1927.  G. A. ANDERSON  1,619,688

TRUCK SIDE FRAME

Filed Dec. 27, 1922   2 Sheets-Sheet 2

Inventor
Gustaf A. Anderson
By
His Attorney

Patented Mar. 1, 1927.

1,619,688

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed December 27, 1922. Serial No. 609,212.

My invention relates to side frames for car trucks and more particularly to the type set forth in my co-pending application Serial No. 595,094, filed October 17, 1922, of which the present application is a continuation in part.

The present invention has been primarily designed to provide a strong, stiff and comparatively light weight construction in which costs incident to maintenance are reduced to a minimum, and generally stated, involves the production of a truck side frame from a wrought metal blank which is cut, flanged, folded and united to form spaced inner and outer side walls, each of said walls including a plurality of truck column portions, a plurality of top arch bar portions, a plurality of bottom arch bar portions, and a plurality of pedestal tie bar portions.

One of the principal features of my invention, particularly stated, is to provide a car truck side frame from a blank of metal, the marginal flanges of portions of said blank extending beneath the truck column portions and bolster opening, and being abutted and welded preferably on the longitudinal center of the side frame, and the continuing marginal flanges of the adjacent pedestal tie bar portions being overlapped and riveted with portions thereof extending beyond and to either side of the longitudinal center of the frame.

A further object of the invention is to provide a car truck side frame from a flanged blank of metal adapted to be folded at the top and united at the bottom, a plurality of welds being used to join the adjacent flanged portions of the blank at the base of the truck columns, and comparatively few advantageously located rivets being utilized to unite overlapped portions of said flanges between the base of the truck columns and the ends of the side frame. In my present construction, the side walls of the frame are provided with symmetrically cut truck column portions, top arch bar portions, bottom arch bar portions, and pedestal tie bar portions, but in the flanging of the overlapped portions of the frame different radii are used, thereby making it possible to provide for symmetrical blanking about the longitudinal center line and yet have the extended flanges of the overlapped portions approximately the same length and in so doing permit the use of centrally located longitudinally arranged rivets with a maximum amount of metal upon each side of said rivets.

Another object of the invention is to form a truck side frame from a blank of wrought metal in which the pedestal tie bar sections of the blank are provided with portions adapted to be overlapped and riveted, the overlapped portions forming an increased bearing area for the journal box bolts and consequently a stronger tie connection for the journal box in which the transverse stresses from the bolts are transmitted through said overlapped flanges directly to the side walls.

Another object of the invention is to provide a pressed metal side frame in which the truck column portions are formed with offset portions arranged inwardly of the side walls of the frame to form bolster guides, said guides being adapted to receive bolster chafing or wear plates, the side faces of which latter are of a depth to prevent the use of the weld connection as a part of the wearing surface with which the bolster contacts. As a direct result of this construction, I am enabled to provide spaced apart and comparatively few weld points, and as said weld points are located outside of the bearing area, the task and added expense of finishing or dressing the same by grinding, as has heretofore been the practice, are obviated.

A further feature of the invention is to provide a reinforcing means for the ends of the side frame above the journal boxes, said means including a substantially rectangular blank of metal having two opposite corners thereof bent upwardly and riveted to the spaced side walls of the side frame and the remaining two opposite corners of the blank being also bent upwardly to form .ips adapted to engage the heads of the journal box bolts and prevent their rotation under service conditions.

A further feature of the invention is to provide certain of the flanged portions of the blank with projections or tabs, said projections in addition to providing advantageous gripping portions for bending the blank, being designed with a portion against which a tool may be placed to force or pry the journal box loose from the side frame.

A still further feature of the invention consists in manufacturing a car truck side frame by forming from a sheet of wrought metal a blank having corresponding side frame portions which are symmetrically disposed with respect to an axis of symmetry passing between them, bending corresponding portions of said blank to form flanges, some of which flanges are bent on different radii to provide for the overlapping thereof, folding the blank with portions of the flanges abutting and other portions overlapping, welding the abutted portions, and riveting said overlapped portions.

There are other features of the invention pertaining to the particular relation of parts and details of construction, as will hereinafter appear.

In the drawings illustrating the invention, the scope whereof is pointed out in the claims:

Figure 1 is a view partly in side elevation and partly in vertical section of a car truck side frame embodying my invention, the wheels and journal boxes of the truck being shown in dotted lines.

Figure 2 is a vertical sectional view on the line 2—2 of Figure 1, a portion of the spring plank and saddle casting thereof being shown in dotted lines.

Figure 3 is a detail bottom plan view of a portion of the side frame showing the relation of the welded portions, the overlapped and riveted portions, and the intervening transition portion of the continuous marginal stiffening flanges.

Figure 4 is a detail bottom plan view of one of the bottom arch bar portions showing the same united to the reinforcing member in position.

Figure 5 is a detail horizontal sectional view through the truck column portion and connected bolster wear plate, on the line 5—5 of Figure 1.

Figure 6 is a detail cross sectional view on the line 6—6 of Figure 1 showing the inturned flanges of the pedestal tie bar portions overlapped and riveted, the radii about which said flanges are bent being different.

Figure 7 is a detail side elevation of a modified form of reinforcing plate or member in which single rivets of relatively large size are used for connecting the reinforcing plate to the side walls of the frame, said rivets being located in staggered relation.

Figure 8:
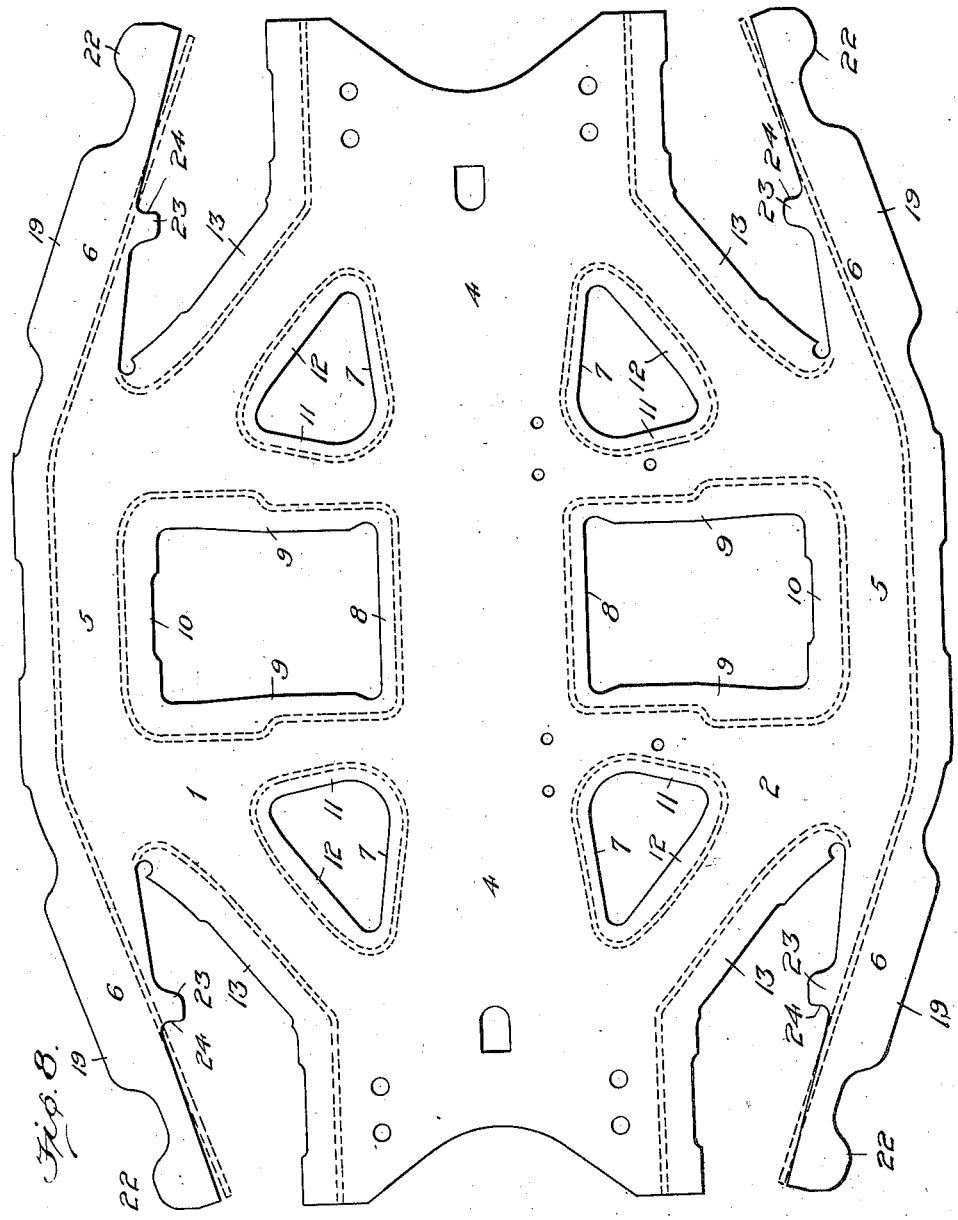
Figure 8 is a view illustrating a sheet metal blank used for forming the truck side frame constructed in accordance with my present invention.

Referring to the drawings in which similar reference characters designate corresponding parts in the several views, my improved side frame includes an outer wall 1 and an inner wall 2 formed from a continuous sheet or blank of wrought metal folded at the top. The walls are arranged in spaced relation and each comprises truck column portions 3, top arch bar portions 4, bottom arch bar portions 5, and pedestal tie bar portions 6. The blank is preferably folded at the top of the side frame on a straight line which is parallel to an axis of symmetry passing between said symmetrical side frame portions, said portions being provided with inwardly extending stiffening flanges, all of which are preferably bent from one side of the blank, as best shown in Figure 8. The full lines in said figure indicate the contour of the blank as originally cut.

The top of the side frame is preferably slightly crowned, as shown, the lower edges of the top arch bar portions being provided with inwardly extending stiffening flanges 7, the said lower edges being downwardly inclined from the truck column portions to produce in effect a cambered compression member. Inwardly projecting stiffening flanges 8 are also provided on the lower edges of the top arch bar portions between the truck columns, said flanges being continued around the upper corner bends adjacent the truck columns and merging into similar flanges 9 extending inwardly from the truck column portions. The portions of the side walls between the truck column portions are also provided with inwardly extending stiffening flanges 10, said flanges being continuations of the vertically arranged flanges 9 and adapted to extend across the lower edge of the bolster or window opening. At each corner bend adjacent the lower edge of said window opening, the merging flanges 9 and 10 are abutted and welded, said weld forming one of the welds provided at the base of the truck column.

The rear edges of the truck column portions are preferably provided with inwardly extending stiffening flanges 11, said flanges conforming to the angular disposition of said rear edges of the truck column portions, as shown in Figure 1. The flanges 11 unite with the inwardly extending flanges 7 provided on the lower edges of the top arch bar portions, said flanges 11 also uniting with adjacent continuing stiffening flanges 12 extending inwardly and provided along the upper edges of the bottom arch bar portions. The flanges 7, 11 and 12 surround the substantially triangularly shaped openings in the said frame, adding rigidity to the frame adjacent the corresponding side frame portions and also permitting omission of considerable metal from the blank without impairing its strength value.

The bottom arch bar portions 5 are each formed with an inwardly extending stiffening flange 13, portions of the respective edges of the adjacent flanges being abutted and welded. One of the welds uniting the abutted flanges 13 is positioned relatively close to the base of the truck columns, and is indicated by the numeral 14, said weld being advantageously located at this point to best stand the strains of service conditions, and constituting the second of the three welds hereinbefore referred to as arranged at the base of the truck columns. The inwardly extending flanges 13 are prolonged over the journal boxes and are abutted on the longitudinal center of the side frame, as clearly shown in Figure 4. Each prolonged extension is formed with semi-circular notches 15 adapted to co-act with similar adjacent notches to form the journal box bolt openings. The welds uniting the abutting portions of the prolonged extensions are located immediately adjacent the notches forming the bolt openings, thereby providing strong and efficient bearing areas for the bolts at these points.

The prolonged extensions of the flanges 13 above the journal boxes are, in addition to being abutted and welded, also preferably reinforced by a plate member or section 16, said member being provided with upwardly extending oppositely disposed side portions adapted to be riveted to the respective inner and outer side walls of the side frame. Rivets 17 connect the reinforcing member to the side walls 1 and 2. The bottom or base portion of the reinforcing member 16 contacts the prolonged and united extensions of the bottom arch bar portions, and is provided with openings 18 adapted to register with the journal box bolt openings formed in said prolonged extensions. A double bearing area is thereby afforded for the journal box bolts by the interpositioning of the reinforcing member, and at the same time the ends of the side frame are materially strengthened. The longitudinal opposite ends of the reinforcing plate member are preferably bent upwardly to form lips which engage the side faces of the journal bolt heads and prevent rotation thereof. In practice the reinforcing member is formed from a substantially rectangular plate or sheet of metal, the opposite corner portions thereof being bent upwardly to provide riveting areas against the side walls of the frame, and locking means for the journal box bolts between the side walls of the frame.

In Figure 7 a modified form of reinforcing plate 16ᵃ is shown, a single rivet of relatively large size being used to attach the plate to each side wall of the side frame. The rivets are preferably staggered, as shown, to provide for their insertion. In other respects the reinforcing plate is substantially identical with the embodiment shown in Figure 1.

The pedestal tie bar portions 6 are each provided with inwardly extending stiffening flanges 19, said flanges being continuous beneath the lower arch bar portions and bolster opening, and preferably terminating in substantially flat ends adapted to be connected to the underside of the journal box. Portions of said flanges are abutted beneath the truck columns and welded, as indicated at 20, said weld being located on the longitudinal center line of the side frame and constituting the third of the weld points hereinbefore referred to. A cross section of the side frame immediately adjacent the base of the truck columns forms a box section of great strength at the points of maximum stress, the box section continuing beneath the bolster opening. The location of the plurality of welds at the base of the truck columns provides a strong construction, there being no rivets used in my present embodiment of the invention which would be subjected to the vertical load.

Each flange 19 is provided with an extending portion forming a projection adapted to overlie the longitudinal center of the side frame, as clearly shown in Figures 3 and 6. The extending portions of the flanges 19 are overlapped and connected by means of rivets 21, said rivets being preferably located in a plane passing through the longitudinal center of the side frame. The portions of the flanges 19 which are provided with overlapping extensions of tabs are preferably symmetrical, that is, each flanged pedestal tie bar portion is similarly formed and in order to overlap said extensions with a maximum amount of metal upon each side of the rivets, the flanges 19 are bent inwardly on different radii, as clearly shown in Figure 6. The uppermost flange 19 is bent inwardly on a relatively smaller radius than the lowermost adjacent flange. The lowermost flange 19 is bent inwardly on a relatively larger radius than its adjacent uppermost flange, said radius permitting the extension or tab on said flange to project a maximum distance beyond the longitudinal center of the side frame substantially equal to its adjacent overlapping extension, thereby providing a very strong and effective riveting area. The overlapping of the extending flanged portions, in accordance with my present invention, provides a particularly strong connection immediately adjacent the critical points in the side frame, said connection being easily effected in the manufacture of the frame because of the advantageous disposition of the rivets.

In forming the overlapping connection of the pedestal tie bar portions with the compensating radii aforesaid, the continuous marginal flanges between the weld 20 and the rivets 21 are disposed in transition to gradually effect the overlapping with minimum stretching of the metal. A gap or opening is preferably left between the flanges intermediate the innermost rivet 21 and the weld 20. The overlapped portions of the flanges are preferably disposed to provide a gradually increasing cross sectional area of metal reaching its maximum size at a point through which the innermost journal box bolt extends. This increased thickness of the metal provides a strong bearing area and permits the journal box bolts to take the strains, thereby reducing all tendency of horizontal shear between the side walls, to a minimum.

The overlapping portions of the flanges just described provide adjacent bearing surfaces for one of the journal box bolts and at least some of the connecting rivets. The flanges 19 are also provided with extensions 22 having openings therein adapted to be overlapped at the ends of the side frame, said overlapped extensions forming a very strong bearing surface for the outer journal box bolt, and acting in conjunction with the heretofore described overlapped extensions to effectively resist strains incident to service conditions. The side walls of the side frame are preferably tapered inwardly at each end of the frame, as shown in Figure 3. The journal box bolts passing through the ends of the side frame are firmly retained in position both above and below the journal boxes, the increased bearing area retaining said bolts being easily inexpensively produced.

Projections or tabs 23 are preferably provided on the pedestal tie bar portions, said projections being used as a holding portion when bending the flanges 19. A face or edge 24 is formed on each tab, said edge being re'atively straight and located close to the inner side wall of the journal box. This construction permits a tool or bar to be easily inserted between said edge 24 and the side wall of the journal box so as to force or pry the same loose.

In my present construction of side frame the truck column portions are inwardly offset at their upper ends to provide vertical bolster guide portions. As viewed in Figure 5 the offset portions are relatively wide and deep so as to provide for the attachment of the wear or chafing plates 25. Each chafing plate is provided with lateral or side faces sufficiently large to receive the full wearing face of the bolster. The plates are preferably attached to the truck column portions by means of spaced weld connections 26, said welds in my present embodiment being located adjacent the top and bottom of said plates. The welds are also located back or clear of the bolster guide and do not receive any of the wear. In my present construction these welds need not be finished to provide a wearing surface for the bolster guide, and as a consequence comparatively small welds can be used at correspondingly reduced cost.

The offset portions on the truck column portions are preferably continued around the corner bend at the junction of the top arch bar portions with the upper ends of the truck column portions, as indicated in Fig. 1. This construction provides for an easement of the metal in the corner bend as well as along the edge of the truck column offset portion, it being obvious that the bending of the stiffening flanges is effected through a gradual disposition of the metal as distinguished from an abrupt or relatively sharp corner bend or pronounced edge portion in which latter construction the metal would be subjected to severe stretching which would ultimately result in cracks and fractures of the frame at these critical points.

While I have shown and described this easement of the metal at the junction of the upper portion of the side wall and truck columns it will be apparent that its use at the lower ends of the truck columns is equally effective in that it is particularly desirable that the metal at these junctions of the truck columns and the beam or load supporting member be not strained in the bending inwardly of the stiffening flanges which project into the bolster opening. An edge portion or transverse corner bend through the column or beam member of a receding nature is desirable to avoid the possibility of unduly stretching the metal, and I do not wish to be understood as limiting myself either to the location or exact character of said receding or gradually bent edge portion.

My improved method of manufacturing car truck side frames includes, among other things, forming a continuous sheet metal blank having corresponding side frame portions which are symmetrically disposed with respect to an axis of symmetry of the blank passing between them, bending corresponding portions of said blank to form marginal flanges, said flanges being provided with portions adapted to be overlapped and united. One of the marginal flanges of the overlapped portions is bent with relation to its adjacent flange so as to compensate for the difference in length of the overlap, this being accomplished by the use of different radii about which the marginal flanges are bent. Another step in the manufacture of my present side frame involves the use of a single die whereby the continuous sheet of metal is blanked out, one-half at a time, the sheet being operated upon to form duplicate halves which are subsequently folded to provide the spaced inner and outer side walls.

The extending portions of the marginal flanges which are overlapped and united are preferably arranged within the limits of the rectangular blank or sheet from which the side frame is formed, that is to say, the location of the portions of the flanges which are overlapped is along the angularly disposed portions of the pedestal tie bars, and as a result considerable saving of metal is effected. It will be observed that my improved method of blanking, flanging and uniting the corresponding side frame portions also involves abutting and welding on the longitudinal center of the side frame portions thereof located at the bottom of the truck columns, and riveting overlapped portions adjacent said welds, said rivets being preferably located on the longitudinal center of the side frame and disposed to provide ample clearance above the rails.

I claim:

1. A car truck side frame involving a wrought metal sheet shaped to form inner and outer side walls, each of said side walls having corresponding side frame portions, means including a plurality of welds uniting the side frame portions, and rivet means uniting other of said side frame portions, said rivet means being located at the bottom of the side frame and arranged on a line passing through the longitudinal center of said frame.

2. A car truck side frame including a metal sheet shaped to form inner and outer side walls, each of said side walls being provided with corresponding side frame portions, a plurality of projections provided on each of said side walls, said projections being overlapped with portions thereof extending beyond the longitudinal center of the side frame, and rivet means connecting said overlapped projections.

3. A car truck side frame including a metal sheet shaped to form inner and outer side walls, each of said side walls being provided with corresponding side frame portions, a plurality of flanges extending inwardly of the side walls, said flanges having portions thereof abutted and welded, and other portions thereof overlapped and riveted.

4. A car truck side frame including a metal sheet shaped to form inner and outer side walls, each of said side walls being provided with corresponding side frame portions, and a plurality of flanges extending inwardly of the side walls, said flanges having portions thereof abutted and welded, and other portions thereof overlapped and riveted, said overlapped portions being prolonged to extend beneath the journal box.

5. A car truck side frame including a metal sheet shaped to form inner and outer side walls, each of said side walls being provided with corresponding side frame portions, and a plurality of flanges extending inwardly of the side walls, portions of said flanges being bent and overlapped, the bending of said flanges occuring about different radii to provide substantially an equal amount of metal upon the portions of the overlap extending upon each side of the longitudinal center of the side frame.

6. A car truck side frame including a metal sheet shaped to form inner and outer side walls, each of said side walls being provided with corresponding side frame portions, and a plurality of flanges formed integral with the side walls and extending inwardly thereof, portions of said flanges being overlapped and united on the longitudinal center of the side frame, the bending of opposite flanges occurring on different radii to provide for substantially an equal amount of metal in the overlapped portions extending beyond the longitudinal center.

7. A car truck side frame including a metal sheet shaped to form inner and outer side walls, each of said side walls being provided with corresponding side frame portions, and a plurality of flanges provided on said side walls and extending inwardly thereof, portions of said flanges being adapted to be abutted and welded, and other portions of said flanges adapted to be overlapped and riveted, the bending of the portions of the flanges which are overlapped occurring on different radii to provide a maximum amount of metal in the portions of the overlap extending beyond the longitudinal center of the side frame.

8. A car truck side frame including inner and outer side walls, each of said side walls being provided with a plurality of truck column portions, a plurality of top arch bar portions, a plurality of bottom arch bar portions, and a plurality of pedestal tie bar portions, flanges formed on said pedestal tie bar portions, said flanges extending inwardly of the side frame and projecting beneath the truck column portions, and a plurality of rivets uniting the inner edges of said flanges adjacent the base of the truck column portions.

9. A car truck side frame including inner and outer side walls, each of said side walls being provided with a plurality of truck column portions, a plurality of top arch bar portions, a plurality of bottom arch bar portions, a plurality of pedestal tie bar portions, flanges provided on said pedestal tie bar portions and extending inwardly of the side walls, said flanges being bent and their inner portions overlapped, the bending of said flanges occurring on different radii to provide a substantially equal amount of metal in the overlap upon each side of the longitudinal center of the side frame, and rivet means uniting said overlapped portions.

10. A pressed metal car truck side frame including pedestal tie bar portions having flanges bent inwardly of the outer faces of the side frame, said flanges being overlapped with a maximum portion thereof overlying the longitudinal center of the side frame, and means uniting said overlapped flanges.

11. A pressed metal car truck side frame including pedestal tie bar portions provided with marginal flanges adapted to be bent upon different radii and having their inner portions overlapped and united.

12. A car truck side frame formed from a metal blank and including pedestal tie bar portions, said portions being provided with marginal flanges adapted to be bent at different radii and having their inner edges overlapped, and means uniting said overlapped portions in a plane passing through the longitudinal center of the side frame.

13. A car truck side frame formed from a metal blank provided with pedestal tie bar portions, marginal flanges provided on said tie bar portions, said flanges being bent on different radii and formed of gradually increasing cross sectional area toward the end of the said frame, the innermost portions of said flanges being overlapped and united.

14. A pressed metal car truck side frame provided with pedestal tie bar portions, continuous marginal flanges provided on said tie bar portions and adapted to be bent on different radii, the inner edges of said flanges being overlapped and provided with a plurality of registering openings, some of said openings being adapted to receive rivets and other of said openings being adapted to receive the journal box bolts.

15. A pressed metal car truck side frame including a plurality of pedestal tie bar portions formed with continuous marginal flanges, portions of said flanges being abutted and welded on the longitudinal center of the side frame and other portions of said flanges being overlapped and riveted on said longitudinal center.

16. A pressed metal car truck side frame including a plurality of pedestal tie bar portions provided with continuous marginal flanges, portions of said flanges being bent upon different radii and overlapped to provide substantially an equal amount of metal in the overlapped portions projecting upon each side of the longitudinal center of the side frame, rivet means connecting said overlapped portions, and other portions of said continuous marginal flanges being abutted and welded.

17. A pressed metal car truck side frame including a plurality of pedestal tie bar portions provided with continuous marginal flanges adapted to be overlapped and united, said flanges increasing in cross sectional area toward the end of the side frame and being provided with a plurality of openings adapted to register to receive the journal box bolts.

18. A car truck side frame involving a wrought metal sheet arranged to form spaced outer and inner walls, each of said walls having a plurality of top arch bar portions, a plurality of bottom arch bar portions, and a plurality of pedestal tie bar portions; said pedestal tie bar portions having a plurality of overlapped portions arranged at spaced intervals upon at least one side of the truck column portions, and means connecting said overlapped portions.

19. A car truck side frame involving a wrought metal sheet arranged to form spaced outer and inner walls, each of said walls having a plurality of top arch bar portions, a plurality of bottom arch bar portions, and a plurality of pedestal tie bar portions; said pedestal tie bar portions having a plurality of overlapped portions, and rivet means connecting said overlapped portions.

20. A car truck side frame involving a wrought metal sheet arranged to form spaced outer and inner walls, each of said walls having a plurality of top arch bar portions, a plurality of bottom arch bar portions, and a plurality of pedestal tie bar portions; a plurality of overlapped portions provided on the lower edges of said pedestal tie bar portions, and means connecting said overlapped portions.

21. A car truck side frame involving a wrought metal sheet arranged to form spaced outer and inner walls, each of said walls having a plurality of top arch bar portions, a plurality of bottom arch bar portions, and a plurality of pedestal tie bar portions; a plurality of perforated overlapped portions provided on said pedestal tie bar portions and arranged to extend beneath the journal box, rivets passing through said certain of the perforated overlapped portions, and journal box bolts passing through other of said perforated overlapped portions.

22. A car truck side frame involving a wrought metal sheet arranged to form spaced outer and inner walls, each of said walls having a plurality of top arch bar portions, a plurality of bottom arch bar portions, and a plurality of pedestal tie bar portions; inwardly extending flanges provided on said pedestal tie bar portions, and projections extending from said flanges, said projections overlappingly being adapted to be connected.

23. A car truck side frame involving a wrought metal sheet shaped to provide a bolster opening and having pedestal tie bar portions extending beneath said bolster opening, and means including a plurality of overlapped portions provided on said pedestal tie bar portions for uniting the free edges of the metal sheet, portions of said edges being abutted and welded beneath the bolster opening and intermediate said overlapped portions.

24. A car truck side frame involving a continuous sheet metal blank shaped to form inner and outer side walls, each of said side walls comprising a plurality of top arch bar portions, a plurality of bottom arch bar portions, a plurality of pedestal tie bar portions, and a plurality of truck column portions, said truck column portions being integrally connected to said several portions and being inwardly offset with respect to the side walls of the side frame to form bolster guide portions.

25. A car truck side frame comprising top arch bar portions, bottom arch bar portions, pedestal tie bar portions, and truck column portions, said truck column portions being formed with inwardly extending offset portions provided at the upper ends thereof to form bolster guides.

26. A car truck side frame including in combination integrally formed top arch bar portions, bottom arch bar portions, pedestal tie bar portions, and truck column portions, inwardly extending offset portions provided on said truck column portions and adapted to form bolster guides, a bolster chafing plate shaped to fit each of said offset portions, and means located at spaced intervals for connecting said bolster chafing plate to each truck column portion.

27. A car truck side frame involving a sheet metal blank shaped to form side walls and a bolster opening, each of said side walls being provided with truck column portions, the upper ends of which are inwardly offset with respect to said side walls, bolster chafing plates uniting said truck column portions, and weld means connecting said chafing plates to the truck column portions, said weld means being located outside of the wearing surfaces of said chafing plates.

28. A car truck side frame involving a sheet metal blank shaped to form side walls and a bolster opening, each of said side walls being provided with truck column portions, the upper ends of which are inwardly offset with respect to said side walls, bolster chafing plates uniting said truck column portions, and means connecting said chafing plates to said truck column portions, said means being spaced from the wearing surfaces of the chafing plates.

29. The combination with a car truck side frame having inwardly offset truck column portions, of bolster chafing plates adapted to fit said offset portions, and means connecting portions of said chafing plates to the truck column portions at points outside of the wearing faces of the chafing plates.

30. A car truck side frame formed from a sheet metal blank and including a plurality of pedestal tie bar portions, each of said portions being formed with a projection adapted to serve as holding means when bending a marginal flange upon the pedestal tie bar portion, said projection having a relatively straight edge portion located relatively close to at least one side wall of the journal box whereby a tool can be inserted and moved between said straight edge portion and journal box to pry the latter loose.

31. The method of manufacturing car truck side frames which consists in forming from a sheet of metal a blank in duplicate half portions from the same die, bending corresponding portions of the blank to form flanges, some of which are adapted to be overlapped, the bending of the overlapped flanges occurring about different radii to provide a maximum amount of metal in the overlap upon each side of the longitudinal center of the side frame, folding the blank, and uniting said flanges.

32. The method of manufacturing car truck side frames which consists in forming from a sheet of metal a blank in duplicate half portions from the same die, said blank having corresponding side frame portions symmetrically disposed with relation to an axis of symmetry passing between them, bending corresponding portions of the blank to form flanges which project from the same side of the blank, folding the blank along a plurality of lines which throughout their length are parallel to said axis of symmetry, portions of the flanges abutted and other portions overlapped, welding the abutted flanges, and riveting the overlapped flanges.

33. The method of manufacturing a car truck side frame which consists in forming from a sheet of metal a blank, said blank having corresponding side frame portions symmetrically disposed with relation to an axis of symmetry passing between them, bending corresponding portions of the blank to form flanges with portions thereof adapted to be overlapped, the bending of the overlapped portions occuring about different radii to provide a maximum amount of metal in the overlap upon each side of the longitudinal center of the side frame, folding the blank along a plurality of lines which throughout their length are parallel to said axis of symmetry, and uniting said flanges.

34. The method of manufacturing a car truck side frame which consists in forming from a rectangular sheet of metal a blank having corresponding side frame portions including a plurality of truck column portions, a plurality of top arch bar portions, a plurality of bottom arch bar portions, and a plurality of pedestal tie bar portions; said pedestal tie bar portions being located within the limits of the rectangular blank, bending corresponding portions of the blank to form flanges, some of which are adapted to be overlapped, the bending of the overlapped flanges occuring on different radii, folding the blank, and uniting said flanges.

35. A car truck side frame involving a wrought metal sheet formed to provide spaced outer and inner side walls and having a bolster opening, and stiffening flanges projecting inwardly of the side walls in the bolster opening, portions of said flanges at the corner bends along the edge of the bolster opening being bent inwardly through a gradual disposition of the metal to form a receding edge portion at the junction of the side walls, and a stiffening flange projecting into said bolster opening.

36. A car truck side frame involving a wrought metal sheet formed to provide spaced inner and outer side walls and having a bolster opening, and a stiffening flange projecting inwardly from at least one of said side walls into the bolster opening, said stiffening flange having a portion thereof bent and disposed at the junction of the flange and adjacent side wall to provide a receding edge portion in which the metal is subjected to minimum strains incident to the bending thereof.

37. A car truck side frame involving a wrought metal sheet formed to provide spaced inner and outer side walls and having a bolster opening, a plurality of truck columns, and stiffening flanges projecting inwardly of the side walls into said bolster opening, portions of said flanges at the junctions of the truck column portions and adjacent side wall portions being bent inwardly through a gradual disposition of the metal to form a receding edge portion which inclines toward and into the bolster opening.

In testimony whereof I affix my signature.

GUSTAF A. ANDERSON.